(12) United States Patent
Boucadair et al.

(10) Patent No.: US 11,985,161 B2
(45) Date of Patent: May 14, 2024

(54) METHOD OF COLLABORATION AND FOR REQUESTING COLLABORATION BETWEEN PROTECTING SERVICES ASSOCIATED WITH AT LEAST ONE DOMAIN, CORRESPONDING AGENTS AND COMPUTER PROGRAM

(71) Applicant: ORANGE, Issy-les-Moulineaux (FR)

(72) Inventors: Mohamed Boucadair, Chatillon (FR); Christian Jacquenet, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 251 days.

(21) Appl. No.: 17/280,000

(22) PCT Filed: Sep. 26, 2019

(86) PCT No.: PCT/FR2019/052280
§ 371 (c)(1),
(2) Date: Mar. 25, 2021

(87) PCT Pub. No.: WO2020/065233
PCT Pub. Date: Apr. 2, 2020

(65) Prior Publication Data
US 2021/0400082 A1    Dec. 23, 2021

(30) Foreign Application Priority Data
Sep. 28, 2018   (FR) ..................... 1871107

(51) Int. Cl.
*H04L 9/40*   (2022.01)
(52) U.S. Cl.
CPC ...... *H04L 63/1458* (2013.01); *H04L 63/0227* (2013.01); *H04L 63/1425* (2013.01); *H04L 63/1433* (2013.01); *H04L 2463/141* (2013.01)

(58) Field of Classification Search
CPC ............ H04L 63/1458; H04L 63/0227; H04L 63/1425; H04L 63/1433; H04L 2463/141
See application file for complete search history.

(56) References Cited

U.S. PATENT DOCUMENTS 10,298,600 B2   5/2019 Li et al.
10,516,695 B1 * 12/2019 Evans ................. H04L 63/1425
(Continued)

FOREIGN PATENT DOCUMENTS

CN    101184088 A    5/2008
CN    104378364 A    2/2015
(Continued)

OTHER PUBLICATIONS

Rescorla, E. et al., "The Datagram Transport Layer Security (DTLS) Protocol Version 1.3 draft-ietf-tls-dtls13-22", Nov. 29, 2017.
(Continued)

*Primary Examiner* — Stephen T Gundry
(74) *Attorney, Agent, or Firm* — David D. Brush; Westman, Champlin & Koehler, P.A.

(57) ABSTRACT

A method of collaboration between protecting services associated with one or more domains. Such a method includes: getting a first agent used by a first protecting service to identify an attack on at least one resource managed by a domain protected by the first protecting service; and transmitting, to at least one second agent used by a second protecting service having taken out a subscription to at least one information-sharing service offered by the first protecting service, at least one piece of information relating to the attack identified by the first agent.

15 Claims, 6 Drawing Sheets

(56) References Cited

U.S. PATENT DOCUMENTS

| | | | | |
|---|---|---|---|---|
| 10,531,305 | B1* | 1/2020 | Verma | H04W 12/08 |
| 10,848,397 | B1* | 11/2020 | Siddiqui | H04L 67/025 |
| 11,399,040 | B1* | 7/2022 | Siddiqui | H04W 12/67 |
| 2016/0119367 | A1* | 4/2016 | Li | H04L 63/20 726/1 |
| 2019/0349426 | A1* | 11/2019 | Smith | H04L 67/104 |
| 2019/0354709 | A1* | 11/2019 | Brinskelle | G06F 21/31 |
| 2020/0067974 | A1* | 2/2020 | Konda | H04L 63/0263 |
| 2020/0076817 | A1* | 3/2020 | Gupta | H04L 63/0815 |
| 2020/0153740 | A1* | 5/2020 | Singh | H04W 28/0226 |
| 2020/0176095 | A1* | 6/2020 | Ansari | H04L 63/083 |
| 2020/0259792 | A1* | 8/2020 | Devarajan | G06F 21/554 |
| 2020/0259793 | A1* | 8/2020 | Pangeni | H04L 41/5006 |
| 2020/0267162 | A1* | 8/2020 | Koottayi | G06F 21/50 |
| 2021/0006632 | A1* | 1/2021 | Rubin | H04W 12/30 |
| 2021/0075766 | A1* | 3/2021 | Kane | H04L 63/0281 |
| 2021/0144157 | A1* | 5/2021 | Smith | H04L 63/1408 |
| 2021/0160330 | A1* | 5/2021 | Boucadair | H04L 63/18 |
| 2021/0168610 | A1* | 6/2021 | Adrangi | H04W 12/069 |
| 2021/0176265 | A1* | 6/2021 | Moore | H04L 63/0263 |
| 2021/0218708 | A1* | 7/2021 | De Hoz Diego | H04L 63/20 |
| 2021/0273974 | A1* | 9/2021 | Boucadair | H04L 63/0263 |
| 2021/0288993 | A1* | 9/2021 | Kraning | H04L 43/50 |
| 2021/0367926 | A1* | 11/2021 | Jiménez | H04L 63/0227 |
| 2021/0392111 | A1* | 12/2021 | Sole | H04L 63/0236 |
| 2022/0038429 | A1* | 2/2022 | Boucadair | H04L 63/0263 |
| 2022/0038473 | A1* | 2/2022 | Boucadair | H04L 63/20 |
| 2022/0053059 | A1* | 2/2022 | Smith | G06F 9/5027 |
| 2022/0076209 | A1* | 3/2022 | Mody | H04L 63/1458 |
| 2022/0114262 | A1* | 4/2022 | Bhatia | G06F 21/577 |
| 2022/0247769 | A1* | 8/2022 | Erlingsson | H04L 67/535 |
| 2022/0312270 | A1* | 9/2022 | Raleigh | H04L 69/18 |

FOREIGN PATENT DOCUMENTS

| | | | |
|---|---|---|---|
| CN | 104639504 | A | 5/2015 |
| CN | 107800668 | A | 3/2018 |
| JP | 2015142324 | A | 8/2015 |
| JP | 2017147516 | A | 8/2017 |
| JP | 2018032906 | A * | 3/2018 |
| JP | 2018032906 | A | 3/2018 |
| JP | 2018133750 | A | 8/2018 |
| WO | 2015070626 | A1 | 5/2015 |

OTHER PUBLICATIONS

Rescorla, E. et al., "Datagram Transport Layer Security Version 1.2", RFC 6347, DOI 10.17487/RFC6347, Jan. 2012.

First Chinese Office Action dated Sep. 29, 2022 for corresponding Chinese Application No. 201980075892.2.

English translation of the Written Opinion of the International Searching Authority dated Jan. 21, 2020 for corresponding International Application No. PCT/FR2019/052280, filed Sep. 26, 2019.

Reddy, T. et al., "Distributed Denial-of-Service Open Threat Signaling (DOTS) Signal Channel Specification", draft-ietf-dots-signal-channel-17, Jan. 22, 2018.

Boucadair, M. et al., "Distributed Denial-of-Service Open Threat Signaling (DOTS) Data Channel", draft-ietf-dots-data-channel-11, Dec. 18, 2017.

E. Rescorla, "The Transport Layer Security (TLS) Protocol Version 1.3", RFC 8446, DOI 10.17487/RFC8446, Aug. 2018.

Dierks, T. et al., "The Transport Layer Security (TLS) Protocol Version 1.2", RFC 5246, DOI 10.17487/RFC5246, Aug. 2008.

International Search Report dated Jan. 13, 2020 for corresponding International Application No. PCT/FR2019/052280, Sep. 26, 2019.

Written Opinion of the International Searching Authority dated Jan. 13, 2020 for corresponding International Application No. PCT/FR2019/052280, filed Sep. 26, 2019.

Steinberger Jessica et al., "Collaborative DDOS defense using flow-based security event information", NOMS 2016-2016 IEEE/IFIP Network Operations and Management Symposium, IEEE, Apr. 25, 2016 (Apr. 25, 2016), pp. 516-522, DOI: 10.1109/NOMS.2016.7502852, XP032918144.

Simpson Steven et al., "An Inter-Domain Collaboration Scheme to Remedy DDoS Attacks in Computer Networks", IEEE Transactions On Network and Service Management, IEEE, USA, vol. 15, No. 3, Sep. 1, 2018 (Sep. 1, 2018), pp. 879-893, DOI: 10.1109/TNSM.2018.2828938, XP011689799.

Rodrigues Bruno et al., A Blockchain-Based Architecture for Collaborative DDoS Mitigation with Smart Contracts, Serious Games; [Lecture Notes in Computer Science; Lect.Notes Computer], Springer International Publishing, Cham, pp. 16-29, Jun. 17, 2017 (Jun. 17, 2017), ISSN: 0302-9743, ISBN: 978-3-540-37274-5, XP047494200.

* cited by examiner

METHOD OF COLLABORATION AND FOR REQUESTING COLLABORATION BETWEEN PROTECTING SERVICES ASSOCIATED WITH AT LEAST ONE DOMAIN, CORRESPONDING AGENTS AND COMPUTER PROGRAM

CROSS-REFERENCE TO RELATED APPLICATIONS

This Application is a Section 371 National Stage Application of International Application No. PCT/FR2019/052280, filed Sep. 26, 2019, the content of which is incorporated herein by reference in its entirety, and published as WO 2020/065233 on Apr. 2, 2020, not in English.

1. FIELD OF THE INVENTION

The field of the invention is that of communications within a communication network, for example an IP network, and in particular that of added-value IP services.

More specifically, the invention provides a solution allowing different protecting services, protecting one or more domains, to collaborate. Such protecting services are for example of type DPS (DDoS protecting services), implementing for example, but not exclusively, a DOTS-type (DDoS Open Threat Signaling) architecture. The protecting service and the infrastructure deployed to provide such a service are indifferently referred to as "protecting service" below.

In particular, the invention provides a solution for coordinating mitigation actions when a denial of service attack is identified.

The invention notably has applications in any field using computer networks that can be subject to a virus, SPAM, SPIT (SPAM over IP Telephony), DDoS, etc. attack.

2. PRIOR ART

An existing problem in the field of mitigation of DDoS attacks is more specifically described in the remainder of this document. Of course, the invention is not limited to this particular field of application, but is of interest for the mitigation of attacks of all kinds.

As a reminder, a DDoS attack is an attempt to make resources, for example network or computing resources, unavailable to their users. Such attacks can be massively deployed by compromising a large number of hosts, and using these hosts to amplify the attacks.

In order to mitigate these DDoS attacks, detection and mitigation services are offered by some access or service providers to their customers. Such protecting services, or DPS (DDoS protecting service), can be hosted within the infrastructures operated by the access providers or in the cloud. In particular, they make it possible to distinguish between "legitimate" traffic, i.e. data consented to by the user, and "suspicious" traffic.

When a DPS-type service is hosted in the cloud, it is difficult to detect a DDoS attack in advance, because such a service is not necessarily present on the routing paths (by default) used to reach the network that is the victim of a DDoS attack.

To solve this problem, it has notably been proposed to set up tunnels to force the traffic (inbound or outbound) onto a site or network to be inspected by the DPS service. However, this approach significantly increases the latency observed by the users and imposes constraints on the sizing of the DPS service to be able to handle all the inbound or outbound traffic from all the users of the network, without compromising the performance or the quality level of the service provided to the customer. Moreover, such tunnels are considered as potential attack vectors.

When a DPS service is hosted within an infrastructure operated by an access provider, even if the DPS service is present in the routing path of the inbound or outbound traffic of a network, difficulties may arise in identifying suspicious traffic. In particular, with the increase in encrypted traffic, especially carried on UDP (for example, QUIC traffic "Quick UDP Internet Connection"), it is difficult to distinguish legitimate traffic from suspicious traffic. The difficulty of accessing plain text control messages, such as the "SYN/SYN-ACK/ACK" messages provided for in the TCP protocol, is another example of the complexity associated with the verification of a network node's consent to receive traffic.

In order to help identify suspicious traffic, a specific architecture has been standardised by the IETF. Such an architecture, called DOTS, allows in particular a client node, called a DOTS client, to inform a server, called a DOTS server, that it detected a DDoS attack and that appropriate actions are required.

Thus, if a client domain is the target of a DDoS attack, a DOTS client that is part of that client domain can send a message to the DOTS server asking for help. The latter coordinates with a mitigator to ensure that suspicious traffic associated with the denial of service attack is no longer routed to the client domain, while legitimate traffic continues to be routed normally to the client domain. The mitigator can in particular be co-located with the DOTS server.

The DOTS architecture is based on the use of two communication channels between the DOTS client and the DOTS server:
 a DOTS Signal Channel, and
 a DOTS Data Channel.

The DOTS signal channel is only used when a DDoS attack is in progress. Thus, a DOTS client can use this channel to request help from the DOTS server. For example, a DOTS client uses this signal channel to send a request to the server informing it that the prefix "1.2.3.0/24" is under a DDoS attack, so that the server can take action to deal with the attack.

Such a signal channel is notably described in the document "*Distributed Denial-of-Service Open Threat Signaling (DOTS) Signal Channel Specification*", draft-ietf-dots-signal-channel, Reddy, T. et al., January 2018.

The DOTS data channel is used when no DDoS attack is in progress. For example, a DOTS client can use this channel to set up filter rules, such as filtering traffic received from certain addresses or traffic destined for a given node. For example, a DOTS client can use this DOTS data channel to ask the server to block all the traffic to the prefix "1.2.3.0/24" or all the UDP traffic destined for the port number 443.

Such a data channel is notably described in the document "*Distributed Denial-of-Service Open Threat Signaling (DOTS) Data Channel*", draft-ietf-dots-data-channel, Boucadair, M. et al., December 2017.

The DOTS architecture only covers the relationship between a DOTS client and its DOTS server, to request assistance when the DOTS client detects an attack. In other words, the DOTS clients/servers belonging to other DPS infrastructures are not aware of the attack.

There is therefore a need for a new technique notably to inform other DPS infrastructures of a large-scale attack, for example a denial of service attack, and thus to coordinate actions between several DPSs, for example mitigation actions.

3. SUMMARY OF THE INVENTION

The invention is based on a new method of collaboration between protecting services associated with one or more domains, implemented by a first agent used by a first protecting service, comprising:
- identifying by the first agent, an attack on at least one resource managed by a domain protected by the first protecting service,
- transmitting, to at least one second agent used by a second protecting service having taken out a subscription to at least one information-sharing service offered by the first protecting service, at least one piece of information relating to the attack identified by said first agent.

Typically, an agent used by a protecting service belongs to a domain/infrastructure offering that protecting service.

In this way, when a client domain is under an attack, the protecting service associated with that client domain can propagate information relating to that attack to protecting services associated with that client domain or with other client domains, so that those other protecting services can anticipate said attack or a similar attack and thus protect those client domains. Also, coordination makes it possible to implement a distributed mitigation plan involving several DPSs or access networks, thereby limiting the propagation of certain attacks.

The transmission step can be restricted to certain types of attacks, neighbouring agents, etc. Policies are typically provided to the agent implementing the collaboration method.

In other words, it is possible to communicate information relating to an attack identified by a protecting service, for example DPS, to other protecting services that might use it, regardless of the scope of the identified attack, and thus to avoid, or at least slow down, the propagation of an attack.

For example, such an attack can be of the type:
- denial of service attack (DDoS, typically);
- computer virus;
- SPAM;
- SPIT;
- etc.

In particular, if an attack is a denial of service attack, identified by a protecting service protecting a first domain, it is possible to inform the protecting services protecting other domains of the mitigation actions taken, thereby allowing the protecting services protecting these other domains to take mitigation actions in advance. This reduces the risk of propagation of the attack to other domains, such as other regions of the Internet network, or of compromising the service provided by the protecting services protecting these other domains.

Thus the invention is not limited to the propagation of information to protecting services deployed within neighbouring domains and/or located on the routing path of the traffic of an attack. On the contrary, the invention enables the creation of interconnections between remote protecting services that want to collaborate with each other to maintain or implement a more effective security policy to deal with attacks that may affect the underlying domains they protect, for example by sharing the mitigation plans they implement. These interconnections are established through to the implementation, in accordance with the invention, of a prior subscription mechanism to protecting services offering the sharing of information relating to all or part of the attacks they identify. At the time of this subscription, various security checks can be carried out to determine whether such information should be shared with the protecting service at the origin of the subscription request.

Through this sharing, the invention can effectively anticipate the attacks, without requiring the protecting services collaborating with each other to have visibility on or control of the same traffic and, in particular, the traffic of the attack. The invention allows a collaboration of protecting services regardless of the nature and scope of an attack, and in particular the resources involved (at the origin of the attack or attacked).

Thus, in a particular embodiment, the invention is based on a characterisation of an attack, in the information provided to the protecting services having subscribed to the information-sharing service, without explicitly associating it with the targets of said attack visible to a protecting service (for example without disclosing the addresses of the targets of the attack as seen by the protecting service that identified the attack). This characteristic is important for preserving the confidentiality of the communications and their nature (for example, the application(s) they are associated with) within a domain protected by a protecting service.

According to at least one embodiment, the proposed solution facilitates the coordination of the mitigation actions, notably through the sharing of information relating to the attacks. It also reduces the time required for implementing mitigation plans through the sharing and the dissemination of mitigation actions between DPS domains.

According to at least one embodiment, the proposed solution also makes it possible to propagate a priori reliable information, since this information is obtained by the protecting service that identified an attack.

According to at least one embodiment, the proposed solution also allows the information to be rapidly propagated, enabling the protecting services receiving the information relating to the attacks to anticipate these attacks and react in an optimal manner so as to limit the misuse of network resources.

According to a particular characteristic, transmitting, to at least one second agent used by a second protecting service, at least one piece of information relating to the attack identified by the first agent, implements sending at least one notification message to the second agent(s) or to an intermediate agent in charge of redirecting the messages.

For example, said at least one notification message comprises at least one piece of information belonging to the group comprising:
- a piece of information relating to the subscription, by said at least one second agent, to at least one information-sharing service offered by said first protecting service;
- an attack identifier;
- a piece of information describing the attack;
- a piece of information relating to the state of the attack;
- a piece of information indicating whether a mitigation action is implemented by the first protecting service;
- a piece of information indicating a mitigation action implemented by the first protecting service;
- a request for assistance in dealing with the attack;
- etc.

This different information may be transmitted in distinct notification messages, or aggregated in a single notification message.

In particular, a new notification message can be sent in case the attack changes. For example, if new sources are involved in the attack, a new notification message is sent to the second agent(s), possibly through an intermediate agent in charge of redirecting the messages.

According to a particular embodiment, the method of collaboration between protecting services includes a prior subscription step, implementing:
- establishing a session between the first agent and said at least one second agent,
- receiving, by the first agent, at least one subscription message to at least one information-sharing service offered by the first protecting service,
- extracting and storing the information conveyed in said at least one subscription message.

For example, said at least one subscription message comprises at least one piece of information belonging to the group comprising:
- a piece of information relating to a type of information-sharing service requested (for example, all the information-sharing services of the first protecting service, the service for sharing information relating to DDoS attacks of the first protecting service, the service for sharing information relating to virus detection of the first protecting service, the service for sharing information relating to SPIT attacks of the first protecting service, etc.);
- an alert level associated with said at least one second agent (for example, only the alerts relating to critical attacks are sent, or only the alerts that match the filters indicated by an agent used by a protecting service are sent);
- a piece of information relating to the redirection to another agent used by the second protecting service (specifying, for example, whether the notification messages should be sent to another agent used by the same protecting service);
- a validity period;
- etc.

This different information can be transmitted in distinct subscription messages, or aggregated in a single subscription message.

In particular, such a method comprises the automatic deletion, when the validity period associated with the subscription message expires, of the information conveyed in a subscription message that were previously stored.

The invention is also based on a new method for requesting collaboration between protecting services associated with one or more domains, implemented by at least one second agent used by a second protecting service having taken a subscription to at least one information-sharing service offered by the first protecting service, according to which a first agent used by the first protecting service that identified an attack on at least one resource managed by a domain protected by the first protecting service, the method comprises:
- receiving, by the second agent, at least one piece of information relating to the attack identified by the first agent,
- determining at least one action to be taken, based on the (piece of) information relating to the attack.

In particular, receiving implements receiving at least one notification message, as described above, transmitted by the said first agent or by an intermediate agent in charge of redirecting the messages.

According to a particular embodiment, receiving also implements receiving at least one notification message transmitted by an agent used by a protecting service distinct from the first protecting service.

It is thus possible to correlate the information received from different agents, which can notably confirm the reality or extent of an attack.

For example, said at least one action comprises transmitting, to an entity in charge of the mitigation of the second protecting service, the (piece of) information relating to the attack. Possibly, said at least one action comprises updating the filters managed by the second protecting service.

According to another example, said at least one action comprises transmitting to the first agent, or to an intermediate agent in charge of redirecting the messages, an action-sharing message with the first protecting service. For example, the second agent can request to share a mitigation plan with the first agent (i.e. to be informed of this mitigation plan).

According to a particular embodiment, the method for requesting collaboration between protecting services includes a prior subscription step, implementing:
- establishing a session between the first agent and said at least one second agent,
- transmitting, by said at least one second agent, a subscription message (as described previously) to at least one information-sharing service offered by the first protecting service.

In particular, said at least one second agent retransmits the subscription message before a validity period associated with said subscription message expires.

According to a particular embodiment, the method implemented by the first and/or the second agents also comprises:
- identifying at least one access provider responsible for at least one resource involved in the propagation of the traffic characteristic of said attack,
- transmitting to said at least one access provider a request for filtering the traffic characteristic of said attack entering and/or leaving said at least one resource.

In this way, the protecting services can collaborate with the access providers to filter or even block upstream the traffic from machines involved in an attack, thereby limiting the propagation of the attack as close as possible to its source.

It is also noted that, according to the prior art, when a large number of machines are involved in carrying out the attacks, implementing appropriate filtering policies, i.e. capable of isolating the traffic from all the machines involved in the attacks, is all the more complicated as these machines can be massively distributed over several distinct networks. In such a context, the implementation of filters is complicated by the identification and declaration of a large number of addresses or networks, with risks of configuration errors that could jeopardize the routing of legitimate traffic. In addition, the switching performance of the machines on which such filters (or ACLs, Access Control Lists) are installed can be inversely proportional to the number of configured access lists: the more filters there are, the longer it takes to decide on the packet routing, which can degrade the switching performance of the machines. Installing a large number of ACLs is itself considered as a DDoS attack.

The embodiment proposed above allows in particular to distribute the filtering actions among several access providers, which facilitates the large-scale implementation of filters.

Another embodiment relates to an agent used by a protecting service, configured to identify an attack and transmit at least one piece of information relating to the identified attack to an agent used by another protecting service having taken out a subscription to at least one information-sharing service offered by this protecting service, and/or configured to receive at least one piece of information relating to an attack identified by an agent used by another protecting service to which it subscribed to an information-sharing service and determine at least one action to be taken as a result.

For example, such an agent is a node of the infrastructure used to implement the protecting service, embedding specific functionalities allowing it to identify an attack/transmit at least one piece of information relating to the attack and/or receive at least one piece of information relating to an attack/determine at least one action.

In another embodiment, the invention relates to one or more computer programs comprising instructions for implementing a method of collaboration between protecting services, or for requesting collaboration between protecting services, according to at least one embodiment of the invention, when this or these programs is/are executed by a processor.

In yet another embodiment, the invention relates to one or more information mediums, irremovable, or partially or totally removable, computer-readable, and comprising instructions from one or more computer programs for executing the steps of the method of collaboration between protecting services, or for requesting collaboration between protecting services, according to at least one embodiment of the invention.

The methods according to the invention can therefore be implemented in various ways, notably in wired form and/or in software form.

4. LIST OF FIGURES

Other characteristics and advantages of the invention will emerge more clearly upon reading the following description of a particular embodiment, provided as a simple illustrative non-restrictive example, and the annexed drawings, wherein.

5. DESCRIPTION OF AN EMBODIMENT OF THE INVENTION

5.1 General Principle

The general principle of the invention is based on collaboration between at least two protecting services associated with one or more network domains. The invention enables in particular to inform a remote protecting service associated with a remote domain when an attack on a resource managed by a local domain is detected by the local protecting service.

Figure 1:
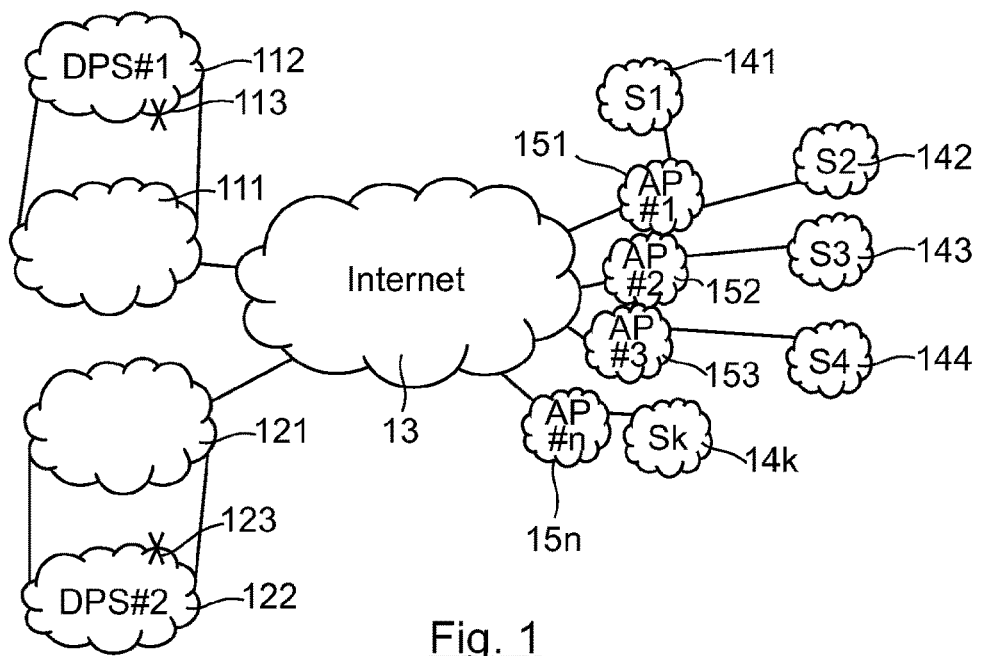
FIG. 1 illustrates an example of a communication network implementing a method of collaboration, or for requesting collaboration, between protecting services, according to an embodiment of the invention.

In relation to FIG. 1, different equipments of a communication network able to implement collaboration between protecting services according to an embodiment of the invention are presented.

For example, a first domain 111, associated with a first protecting service 112, noted for example DPS #1, and a second domain 121, associated with a second protecting service 122, noted for example DPS #2, are considered.

For example, a domain contains one or more machines, also called nodes. The term "domain" or "network" is used here to refer to a set of machines or nodes under the responsibility of the same entity.

The first and second protecting services 112 and 122 protect the network resources of the first and second domains 111 and 121 respectively. The first and second domains 111 and 121 can be connected to the Internet network 13.

Attack sources S1 141, S2 142, . . . , Sk 14k can also be connected to the Internet network 13 via access providers AP #1 151, AP #2 152, AP #n 15n.

Figure 2:
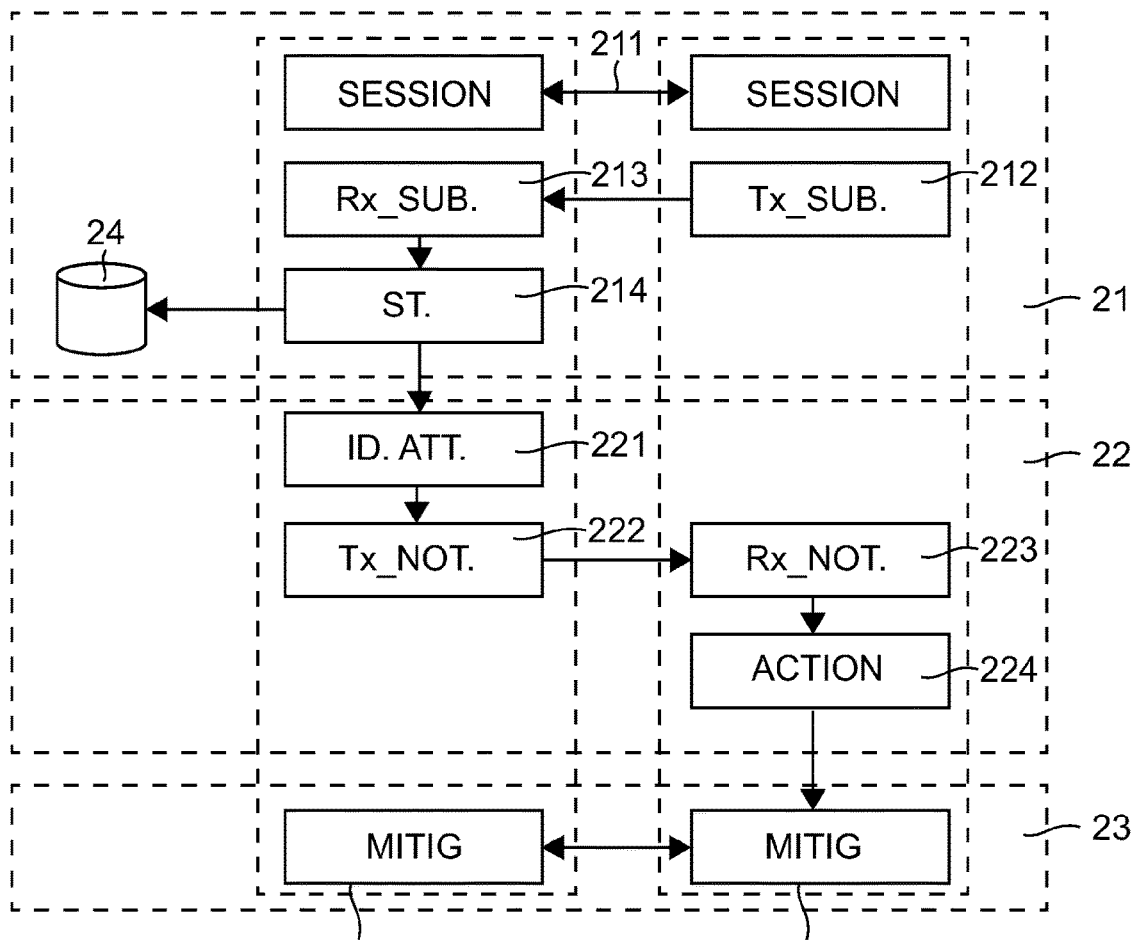
FIG. 2 shows the main steps of the method of collaboration, or for requesting collaboration, between protecting services, according to at least one embodiment of the invention.

FIG. 2 illustrates the main steps implemented for collaboration between protecting services in a communication network such as the one illustrated in FIG. 1.

During a detection phase, a first agent 113 used by the first protecting service 112 protecting the first domain 111 identifies (221) an attack on at least one resource managed by the first domain 111.

For example, an attack can be detected by a node of the first domain 111 (for example a DOTS client) or by a node of the infrastructure used for implementing the first protecting service 121 (first agent 113 embedding specific functionalities according to the invention or other node). The first agent 113 used by the first protecting service can therefore either detect the attack itself or receive this information from another node.

The first agent 113 can then decide to transmit (222) to at least one other agent, for example to a second agent 123 used by the second protecting service 122, protecting the second domain 112, at least one piece of information relating to the attack identified by the first agent 113. Such a piece of information can possibly be transmitted to an intermediate agent, that will retransmit it to the second agent 123 notably.

For its part, the second agent 123 used by the second protecting service 122 receives (223) the (piece of) information relating to the attack identified by the first agent 113 used by the first protecting service 112.

From the received (piece of) information relating to the attack, the second agent 123 can determine (224) at least one action to be taken.

Following the detection phase 22, a mitigation phase 23 of the attacks can be implemented.

For example, it is possible to coordinate several mitigation actions taken following the detection of an attack, in particular at the Internet level, during the mitigation phase 23.

Prior to the detection phase 22, a subscription phase 21 can be implemented.

Such a subscription phase 21 implements for example the establishment 211 of a session between the first agent 113 used by the first protecting service 112 and at least one agent used by another protecting service, for example the second agent 123 used by the second protecting service 122.

To subscribe to the information-sharing services (hereinafter simply referred to as sharing service) of the first protecting service 112, the second agent 123 transmits (212) at least one subscription message to the first agent 113. Such a message can possibly be transmitted to an intermediate agent, that will retransmit it to the first agent 113 notably.

For its part, the first agent 113 receives (213) the subscription message(s) and stores (214), for example in a remote subscription database 24, the information conveyed by the subscription message(s).

The detection phase 22 can then be implemented.

The proposed solution thus makes it possible to coordinate protecting services, possibly at the Internet level, from the detection phase of the attack to the mitigation phase of the attack (whatever the origin of the attack, whatever the vector (for example, a connected object, a tunnel, etc.) and whatever the victims (network, service terminal, etc.)). According to at least one embodiment, the proposed solution guarantees a global and rapid consistency of the information relating to the attack (origin, nature, content, target, vector, etc.) and the actions taken to resolve it.

It is noted that, in a particular embodiment, several protecting services are associated with the same domain, i.e. protect the same domain. An application example is a "multi-homing" corporate network. In this case, the first and second domains 111 and 121 are one and the same domain.

5.2 Application Examples

Embodiments of the invention with DPS-type protecting services, mainly used to deal with the DDoS attacks, are described below.

It is noted however that the proposed solution, as presented below notably, is applicable to other security attacks such as virus propagation, exploitation of operating system vulnerabilities, etc.

5.2.1 Definition of Agents

The proposed solution is based on the assignment of specific functionalities to one or more nodes of the infrastructure used for implementing a protecting service, noted "agent", or, according to a particular embodiment implementing DPS-type protecting services, "DIA agent" (for "DPS IDAD Agent", where IDAD means "Inter-DPS Attack Dissemination and mitigation action sharing and assistance", i.e. assistance and sharing of attack mitigation actions between DPSs).

One or more agents can be activated by a protecting service. An agent of a protecting service can interface with one or more agents of other protecting services.

5.2.2 Communication of the Agents

A) Establishment of a Session

The communication sessions between the agents can be established using known protocols, for example:
- DTLS (Datagram Transport Layer Security, as described in the document "Datagram Transport Layer Security Version 1.2", RFC 6347, Rescorla, E. and N. Modadugu DOI 10.17487/RFC6347, January 2012),
- DTLS 1.3 (Datagram Transport Layer Security, as described in the document "The Datagram Transport Layer Security (DTLS) Protocol Version 1.3, draft-ietf-tls-dtls13-22", Rescorla, E., Tschofenig, H., and N. Modadugu, November 2017),
- TLS (Transport Layer Security, as described in the document "The Transport Layer Security (TLS) Protocol Version 1.2", RFC 5246, Dierks, T. and E. Rescorla, DOI 10.17487/RFC5246, August 2008 or the document "The Transport Layer Security (TLS) Protocol Version 1.3", RFC8446, E. Rescorla, DOI 10.17487/RFC8446, August 2018).

The DTLS or TLS exchanges and the exchanges relating to the management of the security keys are conventional and are not described in more detail.

According to a particular embodiment, it is assumed that the agents used by the protecting services authenticate each other. Thus, the messages received from a machine impersonating a legitimate agent can be rejected by another agent. Similarly, the requests from an agent used by a first protecting service, not authorised to access the information-sharing services offered by a second protecting service, are ignored by an agent used by a second protecting service.

For example, this mutual authentication procedure is implemented by the agents of the protecting services.

B) Communication Modes

The agents used by different protecting services can communicate directly with each other, or via an intermediate agent in charge of redirecting the messages. This intermediate agent is used for example by an FD (Federation Dispatcher).

Figure 3A:
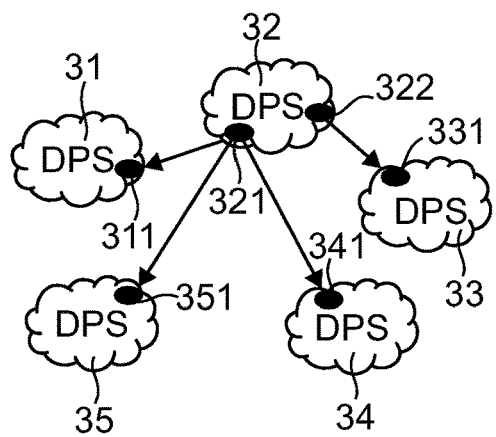
FIGS. 3A to 3C illustrate different communication modes between agents used by distinct protecting services.
Figure 3B:
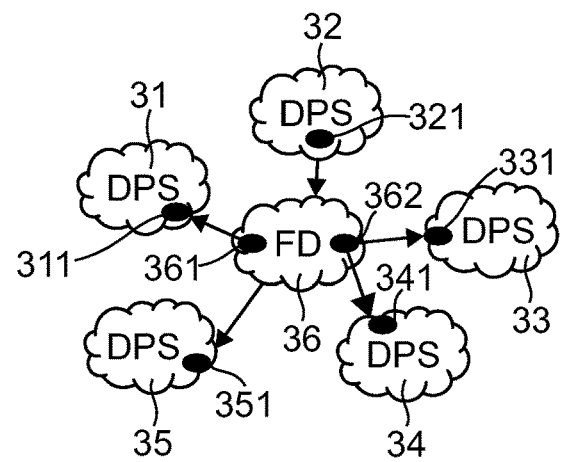
Figure 3C:
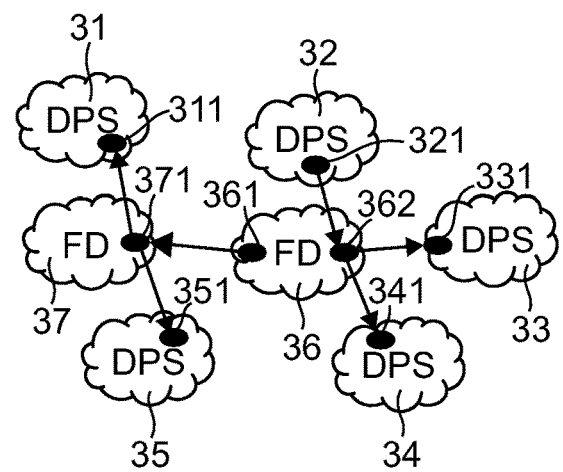

FIGS. 3A to 3C illustrate different examples of communication between the agents used by different protecting services.

FIG. 3A illustrates an example of "point-to-point" mode communication, according to which the agents directly exchange messages between different protecting services. For example, a first agent 321 of a second DPS protecting service 32 directly exchanges messages with a first agent 311 of a first DPS protecting service 31, a first agent 341 of a fourth DPS protecting service 34 and a first agent 351 of a fifth DPS protecting service 35. A second agent 322 of the second DPS protecting service 32 directly exchanges messages with a first agent 331 of a third DPS protecting service 33. The first 321 and second 322 agents of the second DPS protecting service 32 can communicate with each other since they are used by the same protecting service.

According to the example illustrated in FIG. 3A, the second DPS protecting service 32 can send the same message four times to the other DPS protecting services 31, 33, 34 and 35.

FIGS. 3B and 3C illustrate examples of communication in "federation" mode. This mode assumes that the protecting services are organised in federations. The agents send messages to a federation dispatcher, that relays the messages from an agent of a protecting service of the federation to an agent of another protecting service of the federation or to a dispatcher of another federation.

According to the example illustrated in FIG. 3B, the DPS protecting services 31 to 35 are part of the same federation, and can therefore exchange messages through the dispatcher 36. For example, the first agent 321 of the second DPS protecting service 32 exchanges messages with the dispatcher 36. A first agent 361 of the dispatcher 36 redirects the messages from the first agent 321 of the second DPS protecting service 32 to the first agent 311 of the first DPS protecting service 31 and the first agent 351 of the fifth DPS protecting service 35. A second agent 362 of the dispatcher 36 redirects the messages from the first agent 321 of the second DPS protecting service 32 to the first agent 331 of the third DPS protecting service 3 and the first agent 341 of the fourth DPS protecting service 34. The first 361 and second 362 agents of the dispatcher 36 can communicate with each other.

According to the example illustrated in FIG. 3C, the first and fifth DPS protecting services 31 and 35 are part of a first federation, using a first dispatcher 37, and the second, third and fourth DPS protecting services 32, 33, 34 are part of a second federation, using a second dispatcher 72. For example, the first agent 321 of the second DPS protecting service 32 exchanges messages with the dispatcher 36. A first agent 361 of the second dispatcher 36 redirects the messages from the first agent 321 of the second DPS protecting service 32 to a first agent 371 of the first dispatcher 37. The first agent 371 of the first dispatcher 37 redirects the messages from the first agent 321 of the second DPS protecting service 32 to the first agent 311 of the first DPS protecting service 31 and the first agent 351 of the fifth DPS protecting service 35. A second agent 362 of the second dispatcher 36 redirects the messages from the first agent 321 of the second DPS protecting service 32 to the first agent 331 of the third DPS protecting service 3 and the first agent 341 of the fourth DPS protecting service 34. The first 361 and second 362 agents of the dispatcher 36 can communicate with each other.

According to the examples illustrated in FIGS. 3B and 3C, the second DPS protecting service 32 can send the same message only once to the dispatcher 36, that will then retransmit it to the four other DPS protecting services 31, 33, 34 and 35. This mode thus facilitates the application or use of a processing operation carried out by a protecting service, for example to resolve an attack in progress within its area of responsibility (for example a network it protects), while optimising the volume of exchanges between the protecting services of a federation.

5.2.3 Subscribing to a Remote Protecting Service

To implement collaboration between protecting services, an agent used by a protecting service can subscribe, according to at least one embodiment, to at least one information-sharing service offered by a remote protecting service.

For example, it is considered that a secure communication session is established between an agent used by a protecting service, for example the first agent 113 of the first protecting service 112 according to FIG. 1, and an agent wanting to subscribe to at least one information-sharing service offered by the first protecting service, for example the second agent 123 of the second protecting service 122 according to FIG. 1. This communication session can be established between the two agents directly, or between the agents via at least one intermediate agent used by at least one dispatcher within a federation.

Once the session is established, the second agent 123, wanting to subscribe to at least one information-sharing service offered by the first protecting service 112, sends at least one subscription message to the first agent 113, directly or via at least one intermediate agent. In other words, the subscription message is sent by the second agent 123 to the first agent 113 or to a dispatcher.

For example, the subscription message is noted SUB-SCRIBE( ) and comprises at least one attribute, or parameter, carrying a piece of information of type:

"Service_type": piece of information relating to a type or nature of the requested information-sharing service. For example, if no value is indicated, the first agent can interpret the subscription message as a subscription request for the DDoS service of the first protecting service. As an example, the values carried by this parameter can be:
  i. 0: all the information-sharing services supported by the first protecting service (recipient of the subscription message);
  ii. 1: DDoS service of the first protecting service;
  iii. 2: virus detection service of the first protecting service;
  iv. 3: SPAM service of the first protecting service;
  v. 4: SPIT service of the first protecting service;
  vi. etc.
It is noted that the same subscription message can be used to indicate several types of service. As a variant, dedicated subscription messages can be sent per service.

"Verbose_Mode": an alert level associated with the second agent. In other words, this parameter indicates the level of granularity of the notifications that the second agent, wanting to subscribe to at least one information-sharing service offered by the first protecting service, wants to receive. As an example, the values carried by this parameter can be:
  i. 0: only the alerts relating to critical attacks are sent. For example, an attack is said to be critical if the volume of the traffic relating to that attack exceeds a certain threshold, or if it involves a certain number of machines, or if it lasts more than X minutes, etc. This value can be used by default.
  ii. 1: only the alerts that match the filters indicated by one of the agents are sent. A filter can be defined by one or more attributes such as:
    protocol: indicates a specific protocol such as UDP, TCP, NTP, DNS, etc.;
    port number: indicates a specific port number such as 80, 23, 443, etc. Possibly, a range of port numbers can be specified (e.g. 80-8080);
    size of packets characteristic of the attack;
    etc.

N_DIA: a piece of information for the redirection to another agent used by the second protecting service. For example, this parameter specifies whether the subscription message(s) should be sent to another agent used by the same protecting service (redirection case). In this case, at least one IP address of this agent can be provided;

a validity period: this parameter associates a validity period to this subscription. For example, the absence of this parameter or the use of the value (−1) indicates that the subscription duration is infinite;

etc.

Figure 4:
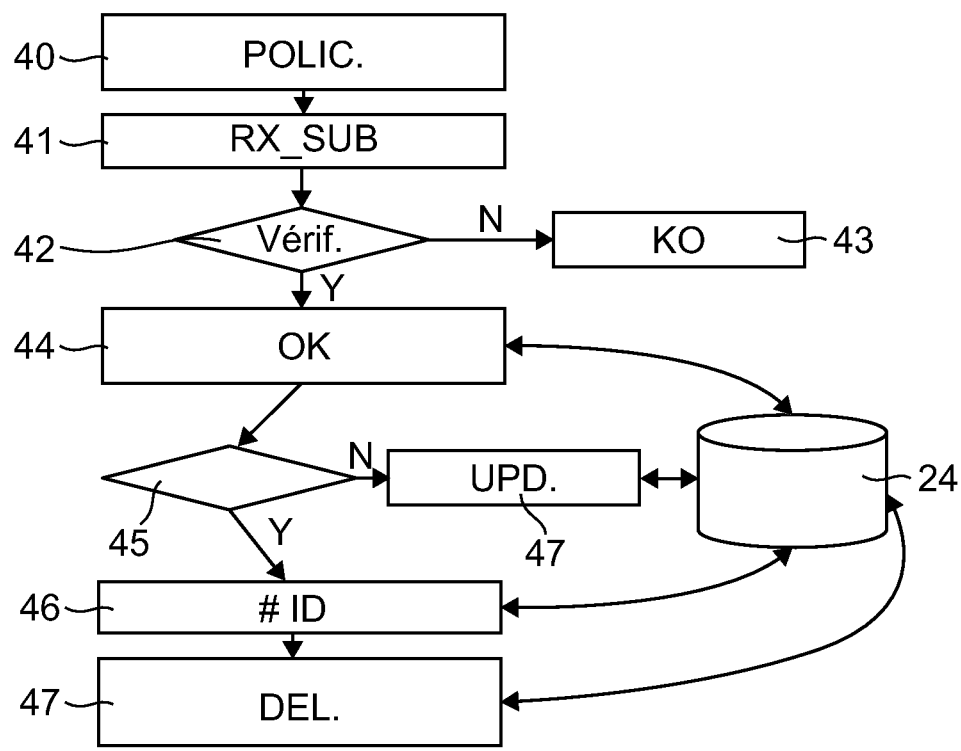
FIGS. 4 and 5 show the main steps implemented by a local agent and by a remote agent during a subscription phase.
Figure 5:
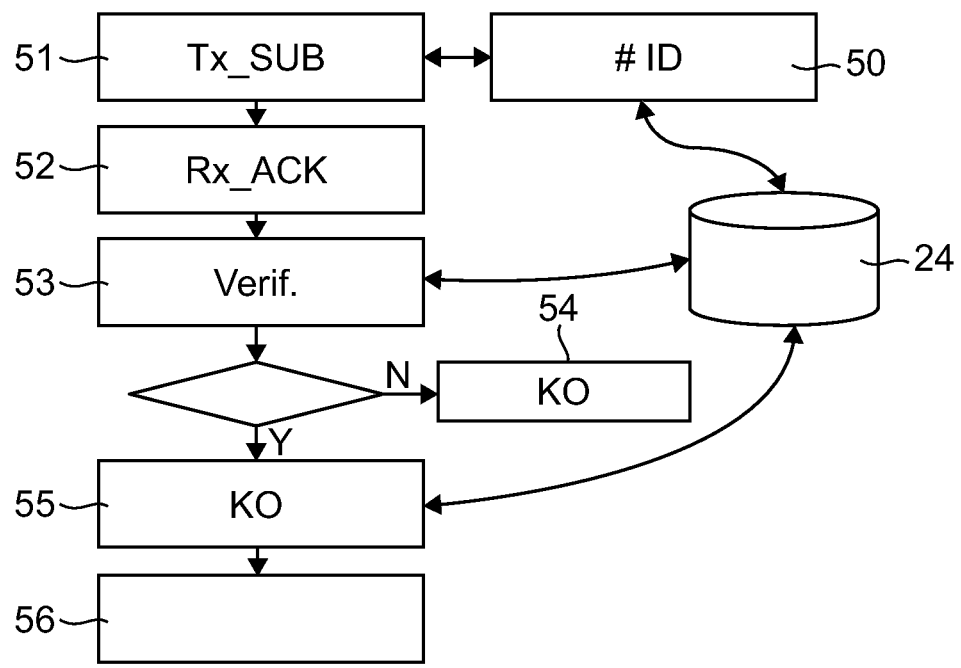

FIGS. 4 and 5 illustrate the main steps implemented by the first and second agents, according to at least one embodiment. More specifically, FIG. 4 illustrates the steps implemented by the first agent 113 used by a first protecting service 112 and FIG. 5 illustrates the steps implemented by the second agent 123, wanting to subscribe to at least one information-sharing service offered by the first protecting service 112.

Once the session is successfully established with the first agent, the second agent 123 sends one or more subscription messages by setting the above-mentioned attributes (step referenced 51 in FIG. 5, similar to step 212 in FIG. 2). An identifier can notably be associated with the subscription request. The subscription identifier can be associated with a "request in progress" state (50) in a subscription database, for example the base 24 according to FIG. 2.

Upon receipt of a subscription message by the first agent 113 (step referenced 41 in FIG. 4, similar to step 213 in FIG. 2), it can perform the security checks (42) to ensure that the second agent 123 is authorised to subscribe to at least one information-sharing service offered by the first protecting service. It is noted that the subscription policy for an information-sharing service may have been defined beforehand (40).

In case the security checks (43) fail, the subscription message is ignored by the first agent 113.

In case the security checks (44) are successful, the first agent 113 extracts the information included in the subscription message to identify the agent sending the subscription message (i.e. the second agent 123), and, for example, identify the protecting service for which it is used (i.e. the second protecting service 122), determine the type of information-sharing service requested (i.e. the value of the "Service_Type" parameter), determine the nature of the notifications (i.e. the value of the "Verbose_Mode" parameter), determine the validity period of the subscription, etc.

This information is then saved in a subscription database, for example the base 24 according to FIG. 2, for example with the subscription identifier.

The first agent also checks whether the subscription message relates to a new subscription (45).

If the subscription message relates to a new subscription, for example from an agent used by a distinct protecting service, a new subscription identifier is created (46) and stored in the subscription database.

If the subscription message relates to an existing subscription, for example a second subscription message from the second agent 123 to provide additional information, the subscription database is updated (47).

The first agent 113 can then respond to the agent that sent the subscription message(s).

For example, the first agent 113 sends an ACK acceptance message to confirm the subscription. The first agent 113 can alternatively send an error message if, for example, the information-sharing service requested by the second agent 123 is not supported by the first protecting service 112 or if the first agent 113 is overloaded, etc.

The receipt (52) of the ACK acceptance message by the agent that issued the subscription message(s) indicates that the subscription was successful Possibly, the second agent 123 can check (53) whether the ACK acceptance message received from the first agent 113 matches the subscription request sent by the second agent 123, by checking the subscription database 24.

If the confirmation does not match the subscription (54), the ACK acceptance message is ignored.

If the confirmation matches the subscription (55), the subscription was successful, and the subscription identifier is associated with a "confirmed" state in the subscription database 24.

The second agent 123 then waits (56) for information from the first agent 113, in particular in case where an attack would be identified by the first agent 113.

According to a particular embodiment, in order to keep the subscription active, the second agent 123 sends a new subscription message before the subscription validity period defined in the subscription message expires. If no message is sent before the validity period expires, the first agent 113 can delete the corresponding subscription from the subscription database 24.

The steps presented above can also be implemented by reversing the direction of the messages if the first agent 113 wants to subscribe to at least one information-sharing service offered by the second protecting service 122. In this case, the first agent 113 sends at least one subscription message to the second agent 123.

Two agents used by distinct protecting services can also exchange "SUBSCRIBE( )" subscription messages with each other.

5.2.4 Using the Remote Protecting Service

The case described previously in relation to FIGS. 4 and 5 is considered again, according to which the second agent 123 sends one or more subscription messages to the first agent 113.

When the first agent 113 of the first protecting service 112 identifies an attack that matches the rules indicated by the second agent 123 in the subscription message and in accordance with local policies, the first agent 113 sends one or more notification messages to the second agent 123 to alert it of this attack, directly or via at least one intermediate agent used by at least one dispatcher.

Figure 6:
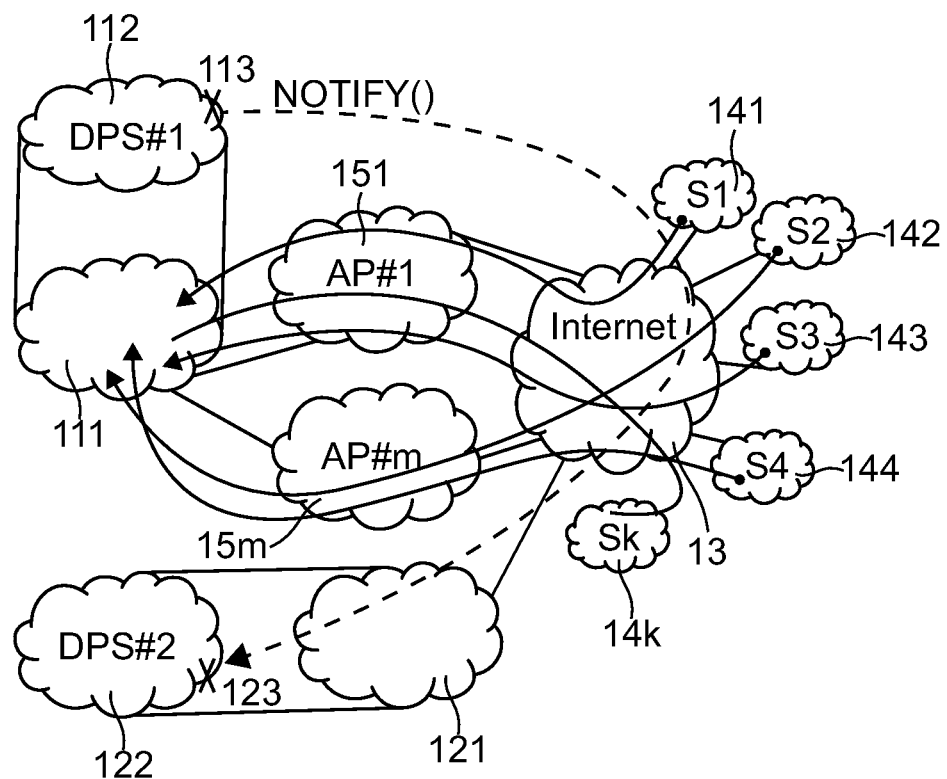
FIGS. 6 and 7 illustrate the transmission and use of a notification message according to an embodiment of the invention.

For example, as illustrated in FIG. 6, the first protecting service 112 detects an attack on at least one resource of the first network 111 it protects, originating from the sources S1 141, S2 142, . . . , Sk 14k, connected to the first network 111 through the Internet network 13 via access providers AP #1 151 and AP #m 15m.

Upon detection of this large-scale DDoS attack, the first agent 113 of the first protecting service 112 sends a notification message ("NOTIFY( )") to the second agent 123 of the second protecting service 122, so that it is informed of the attack in progress and can take actions to avoid, or reduce, the risk that the resources of the second network 121 it protects will in turn be the victims of the same attack as the resources of the first network 111.

For example, the second agent 123 can take the necessary measures to filter the traffic from the sources S1 141, S2 142, . . . , Sk 14k.

Figure 7:
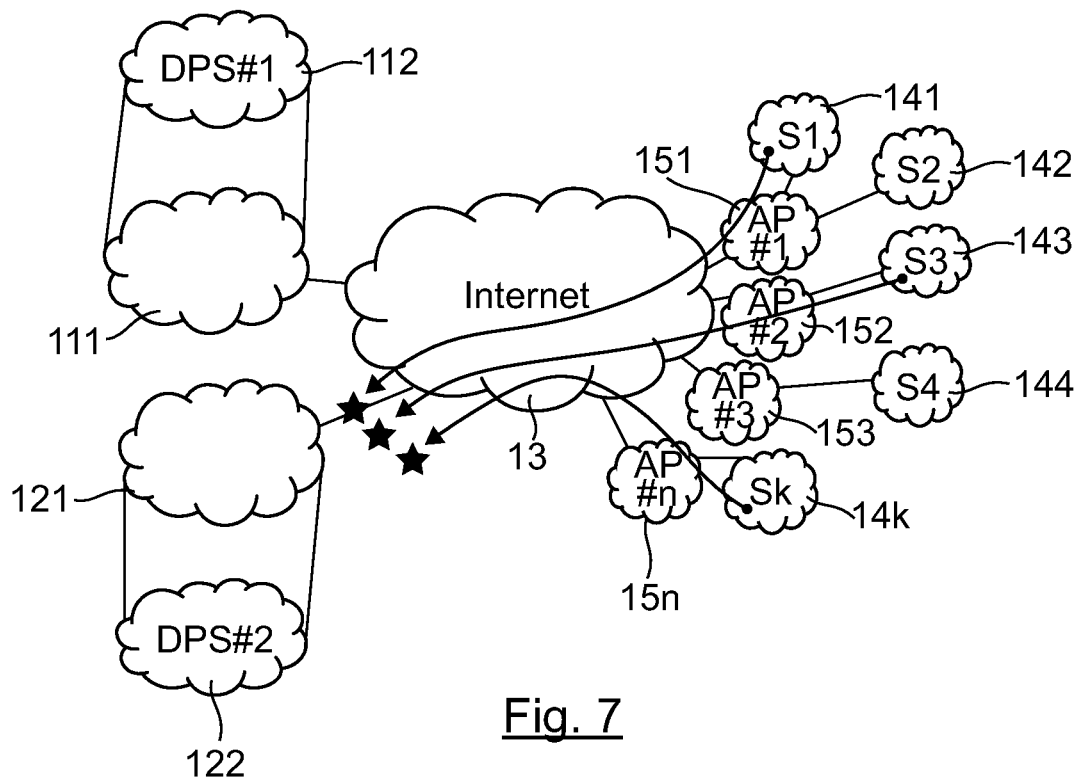

Thus, as illustrated in FIG. 7, the traffic from the sources S1 141, S2 142, . . . , Sk 14k and destined for the second network 121 is blocked upstream, as the second protecting service 122 was already mobilised to take adequate measures following the notification received from the first protecting service 112.

For example, the notification message is noted NOTIFY( ) and comprises at least one attribute, or parameter, carrying a piece of information of type:

SUBSCRIPTION_ID: piece of information relating to the subscription, by the second agent 123, to at least one information-sharing service offered by the first protecting service 112, such as a subscription identifier defined at the time of the subscription;

ATTACK_ID: attack identifier, for example generated by the first agent 113 sending the notification message. According to a particular embodiment, the same identifier is used during the lifetime of an attack;

ATTACK_DESCRIPTOR: piece of information technically describing the attack. For example, this field can include a protocol number, one or more port numbers, the machines involved in the attack (for example, type or model of machines), the direction of the traffic (inbound or outbound), etc., or a combination of these. It should be noted that the technical description can indicate one or more machines concerned by the attack (for example machine_x,_manufacturer_y,_release_z);

STATUS: piece of information relating to the state of the attack. As an example, this parameter can take the following values:

i. 0: the attack is still active;
ii. 1: the attack was successfully blocked;
iii. etc.

LOCAL_MITIGATION: piece of information indicating whether one or more mitigation actions are implemented locally by the first protecting service. This field also carries a technical description of the mitigation actions implemented by the protecting service of the agent sending the notification message. According to a particular embodiment, this information related to the mitigation actions is shared on an informal basis and can be ignored by the agent receiving the notification message. The mitigation actions can be generic (for example, YANG configuration) or manufacturer-specific (for example, configuration file specific to "machine_x,_manufacturer_y,_release_z");

SOS: request for assistance in dealing with the attack. As an example, this field is set to "TRUE" to request assistance from a remote protecting service to stop the attack in progress;

etc.

The notification messages can be of different natures (for example, STATUS, LOCAL_MITIGATION, SOS, etc.).

For example, the first agent 113 can send to the second agent 123, directly or via at least one intermediate agent used by at least one dispatcher, one or more notification messages describing the characteristics of an attack: NOTIFY(ATTACK_ID), NOTIFY(ATTACK_ID, ATTACK_DESCRIPTOR) or NOTI FY(ATTACK_ID, STATUS).

According to another example, the first agent 113 can send to the second agent 123, directly or via at least one intermediate agent used by at least one dispatcher, one or more notification messages describing a local mitigation action, as activated by the first protecting service 112 of the first agent 113 sending the notification message: NOTIFY (ATTACK_ID, LOCAL_MITIGATION).

According to yet another example, the first agent 113 can send to the second agent 123, directly or via at least one intermediate agent used by at least one dispatcher, one or more notification messages requesting assistance in mitigating the attack: NOTIFY (ATTACK_ID, SOS).

It is noted that the description of an attack can vary during the lifetime of such an attack. For example, new sources can be involved, other protocols can be exploited, etc. It is therefore desirable to be able to identify the attack, for example by means of the ATTACK_ID persistent attribute, in order to follow its evolution.

Thus, several notification messages can be sent to notify the agents having subscribed to the information-sharing service offered by the first protecting service of the attack description updates. For example, the NOTIFY (ATTACK_ID=ID1, ATTACK_DESCRIPTOR=DESC #1), NOTIFY (ATTACK_ID=ID1, ATTACK_DESCRIPTOR=DESC #2), and NOTIFY (ATTACK_ID=ID1, ATTACK_DESCRIPTOR=DESC #s) messages are successively transmitted from the first agent 113 to the second agent 123.

The agents having subscribed to the information-sharing service offered by the first protecting service can thus update their filters according to the updates of the attack.

Furthermore, according to at least one embodiment, the ATTACK_DESCRIPTOR attribute describing the attack can also be used to correlate different notification messages received from different protecting services.

For example, if the second agent 123 of the second protecting service 122 receives on the one hand a NOTIFY (ATTACK_ID=ID1, ATTACK_DESCRIPTOR=DESC #m) notification message from the first agent 113 of the first protecting service 112, and on the other hand a NOTIFY (ATTACK_ID=ID2, ATTACK_DESCRIPTOR=DESC #m) notification message from an agent of another protecting service, the second agent 123 can associate these two notifications, having distinct identifiers, with the same attack thanks to the information included in the ATTACK_DESCRIPTOR field. It is thus possible to correlate the information received from different agents, which can notably confirm the reality or extent of an attack.

Examples of notification messages that can be sent successively to characterize the different phases of an attack are presented below:

NOTIFY(ATTACK_ID=ID1, ATTACK_DESCRIPTOR, STATUS=0) is sent to notify an attack in progress;

NOTIFY(ATTACK_ID=ID1, SOS=1) is sent to request assistance from the other protecting services;

NOTIFY(ATTACK_ID=ID1, STATUS=1) is sent to notify that an attack was successfully blocked;

NOTIFY(ATTACK_ID=ID1, LOCAL_MITIGATION) is sent to inform the other protecting services that a mitigation action is implemented locally (i.e. by the protecting service that uses the agent sending the notification message).

Different information can possibly be aggregated in a single notification message, for example:

NOTIFY(ATTACK_ID=ID2, ATTACK_DESCRIPTOR, LOCAL_MITIGATION, STATUS=1) is sent to notify that an attack was successfully blocked (STATUS=1). The message also indicates that a mitigation action is implemented locally (LOCAL_MITIGATION);

NOTIFY(ATTACK_ID=ID2, ATTACK_DESCRIPTOR, STATUS=O, SOS=1) is sent to request assistance from the other protecting services (SOS=1) to deal with an attack in progress (STATUS=0).

Figure 8:
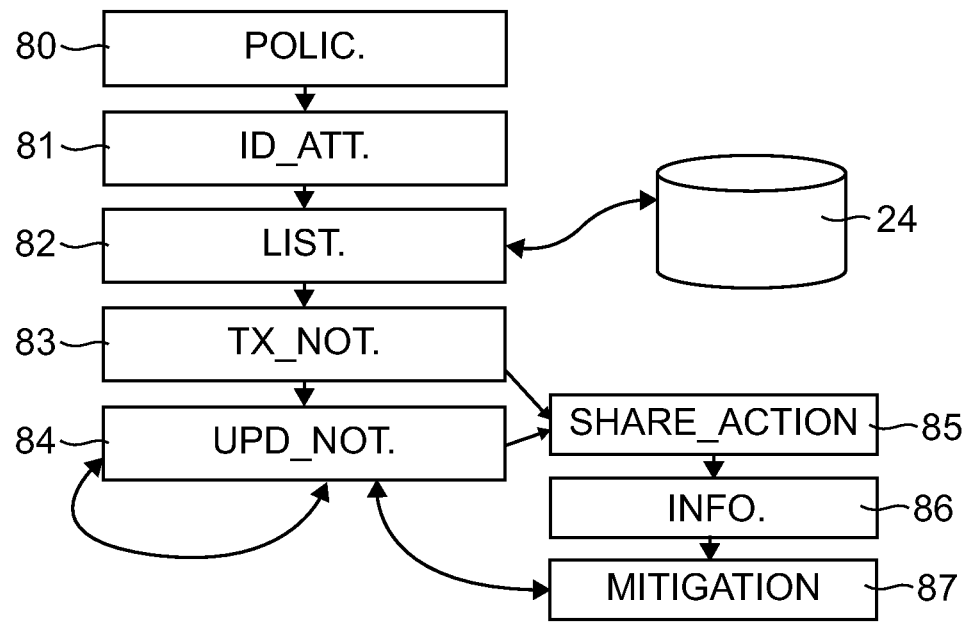
FIGS. 8 and 9 show the main steps implemented by a local agent and by a remote agent during a notification phase.
Figure 9:
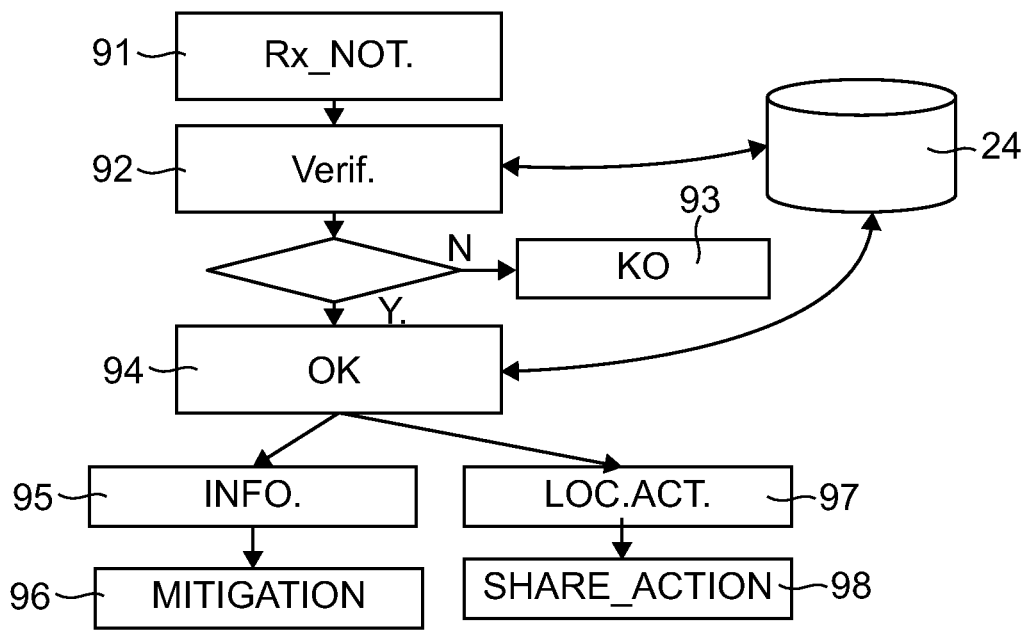

In relation to FIGS. 8 and 9, the main steps implemented by the first and second agents for the notification phase, according to at least one embodiment, are now described. More specifically, FIG. 8 illustrates the steps implemented by the first agent 113 used by a first protecting service 112 to identify an attack and inform the second agent 123, and FIG. 9 illustrates the steps implemented by the second agent 123 receiving the attack information and determining an action to be taken.

As illustrated in FIG. 8, the first agent 113 can identify an attack (step referenced 81 in FIG. 8, similar to step 221 in FIG. 2). For example, the attack can be detected by the first agent 113, by another agent used by the first protecting service 112, or be detected by a network node 111 protected by the first protecting service 112.

It is noted that the policy for identifying the attacks for which at least one second agent (for example, the second agent 123) subscribed to at least one information-sharing service of the first protecting service may have been defined beforehand (80). In this case, during step 81, the first agent 113 identifies an attack matching this policy.

The first agent 113 can then identify (82) at least one protecting service, and for example all the protecting services, using an agent having subscribed to at least one information-sharing service of the first protecting service.

To do this, the first agent 113 can check the subscription database 24.

The first agent 113 can then send notification messages to the agents having subscribed to at least one information-sharing service offered by the first protecting service (step referenced 83 in FIG. 8, similar to step 222 in FIG. 2).

According to a particular embodiment, the first agent 113 can send (84) several notification messages, in particular when the attack is modified, to inform the agents having subscribed to at least one information-sharing service offered by the first protecting service and allow them to update their filters. A delay is observed between two consecutive notifications sent to the same remote agent.

Upon receipt of a notification message (step referenced 91 in FIG. 9, similar to step 223 in FIG. 2), an agent of a protecting service having subscribed to at least one information-sharing service offered by the first protecting service, for example the second agent 123, performs the security checks (92) to ensure that the first agent 113 is authorised to send notification messages.

To do this, the second agent 123 can check the subscription database 24.

In case the security checks (93) fail, the notification message is ignored by the second agent 123.

In case the security checks (94) are successful, the second agent 123 extracts the information included in the message to identify the agent sending the notification message (i.e. the first agent 113) and, for example, identify the protecting service it belongs to (i.e. the first protecting service 112), determine the nature of the notifications (i.e. SOS, STATUS, LOCAL_MITIGATION, etc.). From the extracted (piece of) information, and in particular the nature of the notifications, the second agent 123 can determine at least one action to be taken.

For example, if the notification message informs the second agent 123 that an attack is in progress, then the information characteristic of the attack is extracted from the mitigation message (95) and relayed to an entity in charge of the mitigation ("mitigator") of the second protecting service 112 that implements the second agent 123, so that it can take ad hoc protection measures to anticipate the attack (96). According to a particular embodiment, these actions can be based on those indicated in the notification message if the LOCAL_MITIGATION field was filled in.

If the notification message includes an assistance request for dealing with an attack in progress, the second agent 123 can check whether local actions at the second protecting service can be taken (97). The second agent 123 can send a "SHARE_ACTION( )" action-sharing message to the first agent 113, directly or via at least one intermediate agent used by at least one dispatcher, to share a mitigation plan with the first protecting service and implement mitigation actions locally (98). For example, the second agent 123 can send to the first agent 113, sending the notification message, at least one SHARE_ACTION(ATTACK_ID, LOCAL_MITIGATION) action-sharing message. The mitigation plan shared using the SHARE_ACTION( ) message is not necessarily implemented by the sending protecting service, but can be retrieved from a database aggregating BCPs (Best Current Practices) or past experiences with similar attacks.

The mitigation plan can match filtering actions, the provisioning of resources for flow redirection, etc.

An example of a mitigation plan is presented below:

TABLE 1

```
<mitigation-action>
    <matches>
        <l3>
            <ipv4>
                <protocol>tcp</protocol>
                <source-ipv4-network>
                    1.2.3.0/24
```

TABLE 1-continued

```
                </source-ipv4-network>
            </ipv4>
        </l3>
        <direction>
            inbound
        </direction>
    </matches>
    <actions>
        <forwarding>drop</forwarding>
    </actions>
</mitigation-action>
```

It is noted that the simplified mitigation plan presented in table 1 does not describe a target of the attack, but only characterises the source of the suspicious traffic that is at the origin of the attack: the traffic from such a source (1.2.3.0/24) is therefore filtered in this example.

In particular, in the "federation" transmission mode, implementing at least one dispatcher, the SHARE_ACTION action-sharing message can be broadcasted to the first protecting service that requested assistance, as well as to other protecting services that are part of the same federation.

For example, the SHARE_ACTION(ATTACK_ID=ID1) action-sharing message is transmitted from the second agent 123 to a dispatcher FD, then from the dispatcher FD to the first agent 113 and to at least one other agent of a distinct protecting service that is part of the same federation.

Regardless of the transmission mode, the first agent 113 can therefore wait for a SHARE_ACTION sharing message (step referenced 85 in FIG. 8). Upon receipt of such a message, the first agent 113 can extract the information conveyed by this message (86) to share a mitigation plan with the second protecting service and implement mitigation actions locally (87).

It is noted that the steps presented above in relation to FIGS. 8 and 9 can also be implemented by reversing the direction of the messages if the first agent 113 subscribed to at least one information-sharing service offered by the second protecting service 122. In this case, the second agent 123 sends at least one notification message to the first agent 113.

5.2.5 Access Provider Information

A particular embodiment, implemented by an agent of a protecting service as described above is presented below, making it possible to identify at least one access provider responsible for at least one resource involved in the propagation of the traffic characteristic of the attack.

Indeed, the identification of such an access provider makes it possible to transmit to it a request for filtering the traffic characteristic of the attack.

In this way, the protecting services can collaborate with the access providers to block upstream machines involved in an attack, thereby limiting the propagation of the attack.

Indeed, activating local filters at each protecting service does not systematically block an Internet-wide attack. Moreover, and given the large number of source machines that can be involved in an attack, a large number of filters can be required. Yet the application of these filters impacts the performance of the routers and firewalls.

The agents of the protecting services as described previously can collaborate with the access providers to block upstream the machines injecting traffic characteristic of an attack as early as possible in order to limit the propagation of the traffic characteristic of the attack. According to a particular embodiment, these access providers will then be able to prevent these machines from connecting to the access network(s), for example by refusing to allocate IP addresses/prefixes to them.

It is assumed that the access providers have a programming interface (API) to offer value-added services such as address filtering to third parties.

For example, an agent of a protecting service as described previously determines the identity of the access provider responsible for an IP resource involved in an attack. To do this, the agent of a protecting service (for example the one that identified an attack) queries the database maintained, for example, by the RIPE (Réseaux IP Européens) regional registry.

An example of a request using the RIPE database resources to retrieve the identity of the access provider that manages the IP resource "80.12.102.157" is given below:

https://apps.db.ripe.net/db-web-ui/#/query?search-text=80.12.102.157 #resultsSection As indicated above, this embodiment assumes that the access providers expose a programming interface (API) to offer value-added services to third parties, for example in one or more validation servers hosted by these access providers.

If the access providers expose such an API and if the RIPE database is modified to specify the validation server(s), the response to this request indicates that the IP resource "80.12.102.157" is allocated, according to this example, to the access provider "Orange S.A." and that the validation server(s) are located by the addresses "80.12.102.15" and "80.12.102.16".

An example of a response to the request is given below:

```
Responsible organisation: Orange S.A.
inetnum:      80.12.102.144 - 80.12.102.159
validation server(s): 80.12.102.15, 80.12.102.16
netname:      VISION
descr:        France Telecom NDC
country:      FR
admin-c:      FTO9-RIPE
tech-c:       FTO9-RIPE
status:       ASSIGNED PA
mnt-by:       FT-BRX
created:      2014-11-20T10:56:45Z
last-modified: 2018-02-09T15:00:11Z
source:       RIPE
```

The response specifies in particular that the validation server(s) for this address range "80.12.102.157" can be reached with two addresses: "80.12.102.15" and "80.12.102.16".

Once this address is retrieved, the agent of the protecting service can send a filtering request to the access provider, for example in the form of an ACTION_REQUEST( ) message.

Upon receipt of the ACTION_REQUEST( ) message, the access provider performs checks, notably to verify that the agent that sent the filtering request is a trusted entity.

In case the checks are successful, the access provider can send an ACTION_REPLY message to the agent. The protecting service to which the agent belongs can then activate certain filters to block the traffic from the malicious machine. It is noted that this filtering can be implemented immediately or after an observation phase.

Figure 10:
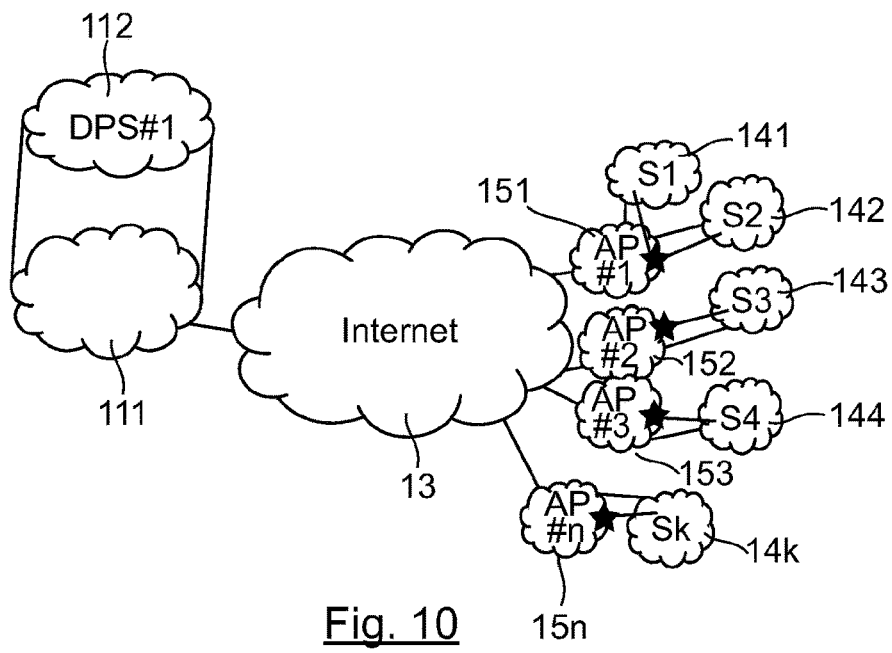
FIGS. 10 and 11 illustrate a particular embodiment allowing an access provider to filter the traffic characteristic of an attack.
Figure 11:
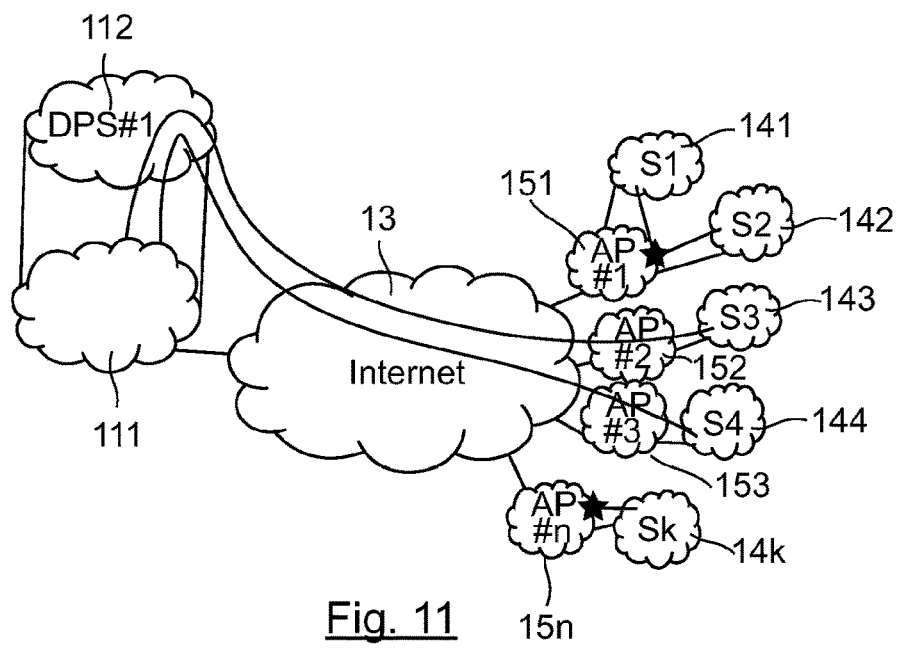

FIGS. 10 and 11 illustrate the implementation of such a solution allowing an access provider to filter the traffic characteristic of an attack.

As illustrated in FIG. 10, the first protecting service 112 protecting the first network 111, connected to the Internet network 13, and the sources S1 141 to Sk 14k also connected to the Internet network 13 through the access providers AP #1 151 to AP #n 15n, are considered. If it is considered that all the access providers AP #1 151 to AP #n 15n implement the solution described above, filtering actions can be distributed among all the access providers, to block the traffic characteristic of an attack upstream of the Internet network 13.

As illustrated in FIG. 11, this solution is of interest even when not all the access providers implement the solution described above. Indeed, as soon as some access providers implement the solution described above, for example the access providers AP #1 151 and AP #n 15n, the protecting services, such as the first protecting service 122, have a limited list of filters to manage.

5.3 Structures

Figure 12:
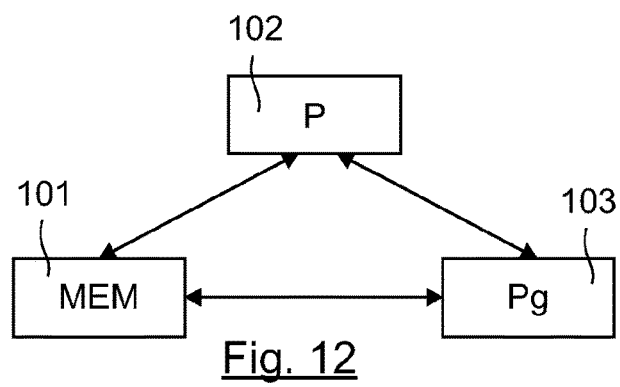
FIG. 12 shows the simplified structure of an agent according to a particular embodiment.

Finally, a description is given, in relation to FIG. 12, of the simplified structure of an agent according to at least one embodiment described above.

Such an agent comprises a memory 101 comprising a buffer memory, a processing unit 102, equipped for example with a programmable computing machine or a dedicated computing machine, for example a processor P, and controlled by the computer program 103, implementing steps of the method of collaboration or for requesting collaboration according to at least one embodiment of the invention.

At initialisation, the code instructions of the computer program 103 are for example loaded into a RAM memory before being executed by the processor of the processing unit 102.

The processor of the processing unit 102 implements steps of the method of collaboration or for requesting collaboration previously described, according to the instructions of the computer program 103, to:
  identify an attack on at least one resource managed by a domain protected by a local protecting service, and transmit, to at least one agent used by a remote protecting service, at least one piece of information relating to the identified attack, and/or
  receive at least one piece of information relating to an attack identified by an agent used by a remote protecting service, and determine at least one action to be taken, based on the (piece of) information relating to said attack.

5.4 Variants

The solution for collaboration between protecting services presented above can be implemented in different contexts, for example:
  the protecting service is managed by the administrator of the network infrastructure to be protected;
  the protecting service is managed by an entity other than the administrator of the network infrastructure to be protected;
  the protecting service is activated within the network infrastructure to be protected;
  the protecting service is activated outside the network infrastructure to be protected (typically, access provider, transit operator, service operator, cloud service provider);
  the network infrastructure to be protected can be an operator network, a corporate network, a residential customer network, a fleet of 5G mobiles, etc.;
  the network infrastructure to be protected can be used to provide a set of services, including for example a connectivity service (typically packet transfer service), a VPN (Virtual Private Network) service or other value-added services, such as telephony, television programme broadcasting (IPTV service), IoT (Internet of Things) telemetry, etc. services;

several network infrastructures can request the same protecting service;

a network infrastructure can invoke the services of one or more protecting services; these protecting services can protect against attacks of different natures or be associated with distinct services, for example according to the traffic profiles characteristic of the different services supported by the network infrastructure;

the sources of an attack can also be resources hosted within the network infrastructure to be protected, which can be the case of MITM (Man-in-the-Middle) attacks, for example;

etc.

In particular, a network operator that applies filters (or ACLs, access control lists), typically on routers and firewalls, can also be considered as a protecting service provider in the context of the invention.

According to at least one embodiment, the proposed solution for collaboration between protecting services can:

rapidly initiate actions for the mitigation of attacks so as to limit the propagation of these attacks and thereby mitigate their magnitude, and/or mobilise all the actors involved in the mitigation of such attacks: protecting services, but also service providers responsible for the networks to which the source at the origin of the attack connected, and/or communicate to all the protecting services of the communication network all the information characteristic of an attack as soon as it is detected. The propagation of such information enables early (or even instantaneous) warning of the protecting services of the communication network in order to facilitate a global and consistent management of the attack and its mitigation while reducing the risk and severity of the damage that such an attack could inflict, and/or implement coordinated and globally consistent filtering policies. Such policies make it possible to install filters at the appropriate locations and thus to optimise the distribution of the access control lists without compromising the performance of the systems (routers, for example) on which these filters are installed.

The invention claimed is:

1. A method of collaboration between protecting services associated with one or more domains, wherein the method is performed by a first agent implemented on a device and comprises:

identifying by the first agent, which is used by a first protecting service, an attack on at least one resource managed by a domain protected by the first protecting service; and transmitting, to at least one second agent used by a second protecting service having taken out a subscription to at least one information-sharing service offered by the first protecting service, at least one piece of information relating to the attack identified by the first agent, wherein the at least one piece of information transmitted by the first agent includes a characterization of the attack without disclosing addresses of targets of the attack as seen by the first protecting service.

2. The method according to claim 1, wherein transmitting at least one piece of information implements sending at least one notification message to the at least one second agent or to an intermediate agent in charge of redirecting the at least one notification message.

3. The method according to claim 2, wherein the at least one notification message comprises at least one piece of information belonging to the group consisting of:

a piece of information relating to the subscription, by the at least one second agent, to the at least one information-sharing service offered by the first protecting service;

an identifier of the attack;

a piece of information describing the attack;

a piece of information relating to a state of the attack;

a piece information indicating whether a mitigation action is implemented by the first protecting service;

a piece of information indicating a mitigation action implemented by the first protecting service; and a request for assistance in dealing with the attack.

4. The method according to claim 1, wherein the method comprises a prior subscription act, implementing:

establishing a session between the first agent and the at least one second agent;

receiving, by the first agent, at least one subscription message to the at least one information-sharing service offered by the first protecting service; and extracting and storing the information conveyed in said at least one subscription message.

5. The method according to claim 4, wherein the at least one subscription message comprises at least one piece of information belonging to the group consisting of:

a piece of information relating to a type of information-sharing service requested;

an alert level associated with at least one second agent;

a piece of information for a redirection to another agent used by the second protecting service; and a validity period.

6. The method according to claim 1, wherein the method further comprises:

identifying at least one access provider responsible for at least one resource involved in a propagation of the traffic characteristic of said attack; and transmitting to said at least one access provider a request for filtering a traffic characteristic of the attack entering and/or leaving said at least one resource.

7. A method for requesting collaboration between protecting services associated with one or more domains, a first agent used by a first protecting service having identified an attack on at least one resource managed by a domain protected by the first protecting service, wherein the method comprises:

receiving, by at least one second agent, which is implemented in a device and is used by a second protecting service having taken out a subscription to at least one information-sharing service offered by the first protecting service, at least one piece of information relating to the attack identified by the first agent; and determining by the at least one second agent at least one action to be take, from the piece of information relating to the attack, wherein the at least one piece of information includes a characterization of the attack without disclosing addresses of targets of the attack as seen by the first protecting service.

8. The method according to claim 7, wherein the receiving implements receiving at least one notification message, transmitted by the first agent or by an intermediate agent in charge of redirecting the at least one notification message.

9. The method according to claim 8, wherein the receiving also implements receiving at least one notification message transmitted by an agent used by a protecting service distinct from the first protecting service.

10. The method according to any claim 7, wherein the at least one action comprises transmitting, to an entity in charge of mitigation of the second protecting service, the piece of information relating to the attack.

11. The method according to claim 7, wherein the at least one action comprises transmitting to the first agent, or to an intermediate agent in charge of redirecting messages, an action-sharing message with the first protecting service.

12. The method according to claim 7, wherein the method comprises a prior subscription act implementing:
- establishing a session between the first agent and the at least one second agent; and
- transmitting, by the at least one second agent, a subscription message to at least one information-sharing service offered by the first protecting service.

13. An agent used by a first protecting service, comprising:
- at least one processor coupled to a memory configured to:
  - identify an attack on at least one resource managed by a domain protected by the first protecting service; and
  - transmit, to at least one second agent used by a second protecting service having taken out a subscription to at least one information-sharing service offered by the first protecting service, at least one piece of information relating to the attack identified by the first agent,
  - wherein the at least one piece of information includes a characterization of the attack without disclosing addresses of targets of the attack.

14. An agent used by a second protecting service having taken a subscription to at least one information-sharing service offered by the first protecting service, said agent comprising:
- at least one processor coupled to a memory configured to:
  - receive at least one piece of information relating to an attack identified by a first agent used by the first protecting service, the attack relating to at least one resource managed by a domain protected by the first protecting service; and
  - determine at least one action to be taken, based on the piece of information relating to the attack,
  - wherein the at least one piece of information includes a characterization of the attack without disclosing addresses of targets of the attack as seen by the first protecting service.

15. A non-transitory computer-readable medium comprising instructions stored thereon for implementing a method of collaboration between protecting services associated with one or more domains, when the instructions are executed by a processor of a first agent, wherein the instructions configure the first agent to:
- identify by the first agent, which is used by a first protecting service, an attack on at least one resource managed by a domain protected by the first protecting service; and
- transmit, to at least one second agent used by a second protecting service having taken out a subscription to at least one information-sharing service offered by the first protecting service, at least one piece of information relating to the attack identified by the first agent,
- wherein the at least one piece of information transmitted by the first agent includes a characterization of the attack without disclosing addresses of targets of the attack as seen by the first protecting service.

* * * * *